United States Patent
Mildren et al.

(10) Patent No.: US 9,972,966 B2
(45) Date of Patent: May 15, 2018

(54) METHOD AND A SYSTEM FOR CONVERTING AN INPUT LIGHT INTO AN OUTPUT LIGHT BEAM

(71) Applicant: Macquarie University, North Ryde (AU)

(72) Inventors: Richard Paul Mildren, Abbotsford (AU); Aaron McKay, Macquarie Park (AU)

(73) Assignee: Macquarie University, North Ryde (AU)

( * ) Notice: Subject to any disclaimer, the term of this patent is extended or adjusted under 35 U.S.C. 154(b) by 0 days. days.

(21) Appl. No.: 15/110,212

(22) PCT Filed: Jan. 7, 2015

(86) PCT No.: PCT/AU2015/000006
§ 371 (c)(1),
(2) Date: Jul. 7, 2016

(87) PCT Pub. No.: WO2015/103667
PCT Pub. Date: Jul. 16, 2015

(65) Prior Publication Data
US 2016/0336715 A1 Nov. 17, 2016

(30) Foreign Application Priority Data
Jan. 8, 2014 (AU) ................................ 2014900048

(51) Int. Cl.
*H01S 3/30* (2006.01)
*H01S 3/0941* (2006.01)
(Continued)

(52) U.S. Cl.
CPC ............... *H01S 3/30* (2013.01); *G02F 1/353* (2013.01); *H01S 3/0941* (2013.01); *H01S 3/163* (2013.01);
(Continued)

(58) Field of Classification Search
CPC .......... H01S 3/30; H01S 3/163; H01S 3/0804; H01S 3/0941; H01S 3/1611;
(Continued)

(56) References Cited

U.S. PATENT DOCUMENTS 9,172,208 B1 * 10/2015 Dawson ................. H01S 3/302
2009/0092157 A1 * 4/2009 Gapontsev ........ H01S 3/094003
372/6

(Continued)

FOREIGN PATENT DOCUMENTS

EP        2 526 220 A1   11/2012
WO   WO 2013/155568 A1   10/2013

OTHER PUBLICATIONS

Sabella, A. et al., "Efficient conversion of a 1.064 | am Nd:YAG laser to the eye-safe region using a diamond Raman laser", Optics Express, vol. 19 No. 23, Nov. 7, 2011, pp. 23554-23560.*
(Continued)

*Primary Examiner* — Xinning Niu
(74) *Attorney, Agent, or Firm* — Wolf, Greenfield & Sacks, P.C.

(57) ABSTRACT

The disclosure herein generally relates to a system (10) for converting an input light (12) into an output light beam (14) that has a spatial beam quality that is greater than that of the input light (12). The system (10) comprises an optical resonator having disposed therein a Raman crystal (20). The Raman crystal (20) is for receiving the input light (12) and the optical resonator is configured to resonate a Stokes light beam (22) generated from the input light (12) by at least one nonlinear interaction within the Raman crystal (20). The at least one nonlinear interaction comprises at least one Raman interaction. The Stokes light beam (22) has a spatial beam quality that is greater than that of the input light (12). The system (10) comprises a light extractor (18) arranged to generate the output light beam (14) by extracting at least some of the Stokes light beam (22) from the optical resonator.

18 Claims, 2 Drawing Sheets

(51) Int. Cl.
*G02F 1/35* (2006.01)
*H01S 3/08* (2006.01)
*H01S 3/094* (2006.01)
*H01S 3/16* (2006.01)

(52) U.S. Cl.
CPC .... *G02F 2001/3542* (2013.01); *H01S 3/0804* (2013.01); *H01S 3/08045* (2013.01); *H01S 3/094038* (2013.01); *H01S 3/094076* (2013.01); *H01S 3/1611* (2013.01); *H01S 3/1673* (2013.01)

(58) Field of Classification Search
CPC ............... H01S 3/1673; H01S 3/08045; H01S 3/094038; H01S 3/094076
See application file for complete search history.

(56) References Cited

U.S. PATENT DOCUMENTS

2011/0176563 A1* 7/2011 Friel ..................... C30B 25/02
372/3
2012/0263196 A1* 10/2012 Pask ................. H01S 3/094026
372/3
2013/0043392 A1 2/2013 Mildren

OTHER PUBLICATIONS

International Search Report and Written Opinion for Application No. PCT/AU2015/000006 dated Apr. 30, 2015.
Bai et al., Efficient 1.8 μm KTiOPO4 optical parametric oscillator pumped within an Nd:YAG/SrWO4 Raman laser. Opt Letters. 2011;36(6):813-5.
Parrotta et al., Multiwatt, Continuous-Wave, Tunable Diamond Raman Laser With Intracavity Frequency-Doubling to the Visible Region. IEEE Journal of Selected Topics in Quantum Electronics. 2013;19(4). 8 pages.
Sabella et al., Efficient conversion of a 1.064 um Nd:YAG laser to the eye-safe region using a diamond Raman laser. Opt Express. 2011;19(23): 23554-60.
Extended European Search Report dated Sep. 28, 2017 in connection with European Application No. EP 15735389.
Kitzler et al., High power cw diamond Raman laser: Analysis of efficiency and parasitic loss. 2012 Conference on Lasers and Electro-Optics (CLEO). IEEE. May 6, 2012;pp. 1-2.

* cited by examiner

METHOD AND A SYSTEM FOR CONVERTING AN INPUT LIGHT INTO AN OUTPUT LIGHT BEAM

TECHNICAL FIELD

The disclosure herein generally relates to a method and a system for converting an input light into an output light beam that has a spatial beam quality that is greater than that of the input light.

BACKGROUND

A Raman crystal is a nonlinear optical crystal that is capable of supporting a nonlinear optical interaction known as stimulated Raman scattering ("Raman interaction"). Lasers that have optical gain provided by a Raman interaction within a Raman crystal ("Raman lasers") show promise.

Raman lasers may be used to generate light beams at a wavelength between approximately 1.4 µm to 1.8 µm—the eye-safe spectral region—and also outside of this wavelength range. Light beams at these wavelengths have many applications including laser range finding, scanning LIDAR, and remote sensing, provided that the light beams have sufficient power and spatial beam quality. A beam with high spatial beam quality may be made to be more intense than a beam with lesser spatial beam quality. Beams that have high spatial beam quality may deliver more power to the target and diverge less. Beams with high beam quality may be more tightly focussed and are also of benefit in many applications that require precise localization of the output beam.

Spatial beam quality of a beam may be characterised by at least one of the beam's $M^2$ and the beam's intrinsic beam brightness Raman lasers having average output powers of up to 5 W and near diffraction limited beam quality (e.g. a beam with an $M^2$ beam quality factor less than approximately 1.2) have been achieved, however, the intrinsic beam brightness of the output light beam is around one half or less of that of the input light. Spatial beam quality may be defined by the ISO Standard 11146, "Lasers and laser-related equipment—Test methods for laser beam widths, divergence angles and beam propagation ratios" (2005)

Consequently, till now it has been generally accepted that an input light that has an excellent beam quality should be selected for an output light beam to retain high brightness.

Sources of input light having a high intrinsic brightness may be relatively large, expensive, and generally inconvenient, and their use may be an impediment to the wider adoption of the technology. Sources of input beams having lower intrinsic beam brightness, however, may be more practical and cost effective. To date, however, the use of these sources has not resulted in a Raman laser that can emit an output light beam having high intrinsic beam brightness.

SUMMARY

Disclosed herein is a method for converting an input light into an output light beam that has a spatial beam quality that is greater than that of the input light. The method comprises the step of a Raman crystal disposed within an optical resonator receiving the input light. The method comprises the step of generating a Stokes light beam resonating within the optical resonator from the input light so received by at least one nonlinear interaction within the Raman crystal. The at least one nonlinear interaction comprises at least one Raman interaction. The Stokes light beam has a spatial beam quality that is greater than that of the input light. The method comprises the step of generating the output light beam by extracting at least some of the Stokes light beam from the optical resonator.

In an embodiment, the input light comprises an input light beam. The input light beam may comprise a plurality of transverse modes. The input light may comprise a plurality of input light beams. The plurality of input light beams may each comprise a plurality of transverse modes.

In an embodiment, the Raman crystal comprises a diamond crystal. The polarization axis of the input light may be aligned to the <111> axis of the diamond crystal. Alternatively or additionally, the Raman crystal comprises at least one of Si, KTP, KTA, $LiNbO_3$, KGW, $YVO_4$, $Ba(NO_3)_2$, and $BaWO_4$.

In an embodiment, the order of the Stokes light beam is at least second order with respect to the input light. The at least one nonlinear interaction may comprise a first Raman interaction generating a first Stokes light beam that comprises a first order Stokes with respect to the input light, and a second Raman interaction generating the Stokes light beam which is a second order Stokes with respect to the input light. It is understood that a first Raman interaction followed by a second Raman interaction may result in an output light beam of superior spatial beam quality. The first Raman interaction between the input light beam and the Raman crystal generates the first order Stokes. The second Raman interaction between the first order Stokes and the Raman crystal generates the second order Stokes. Some embodiments, however, do not have a substantial second Raman interaction. In these embodiments, the output light beam comprises the first order Stokes.

In an embodiment, the step of generating a Stokes light beam resonating within the optical resonator comprises the step of reflecting the Stokes light beam between a first reflective surface and a second reflective surface.

In an embodiment, the power spectrum of the input light has a maximum between 0.8 µm and 2.1 µm. Laser diodes having an output wavelength of 0.8 µm may be an efficient, convenient, and/or economical input light source. Lasers having holmium ion and/or thulium ion doped laser material may be used. The power spectrum of the input light may have a maximum between 1.0 and 1.4 µm. Neodymium and Ytterbium laser sources may emit in this wavelength band, for example. The power spectrum of the input light may have a maximum between 1.06 µm and 1.07 µm.

An embodiment comprises the step of forming a waist of the input light at the Raman crystal.

The spatial beam quality of the input light, the output light beam and the Stokes light beam may be characterised by their respective $M^2$. The $M^2$ of the output light beam and the Stokes light beam is less than that of the input light.

In an embodiment, the input light has a $M^2$ greater than at least one of 1.7, 2, 3, 5 and 10. The input light may have a $M^2$ less than at least one of 50, 20, 10 and 5. The Stokes light beam may have a $M^2$ of less than 1.2. The output light beam may have a $M^2$ of less than 1.2. A light beam having a $M^2$ of less than 1.2 is generally considered to be near diffraction limited.

The spatial beam quality of the input light, the output light beam and the Stokes light beam may be characterised by their respective intrinsic beam brightness. Surprisingly, the intrinsic beam brightness of the output light beam and the Stokes light beam may be greater than that of the input light.

An output light beam that has an intrinsic beam brightness that is greater than that of the input light is previously unknown in the applicant's understanding of prior Raman methods and systems. The effective upgrading of intrinsic beam brightness may allow for the use of input lights having relatively low intrinsic beam brightness, which may provide a more practical device for high power and high intrinsic beam brightness generation.

In an embodiment, the intrinsic beam brightness of the output light beam divided by the intrinsic beam brightness of the input light is greater than at least one of 1, 1.15, 1.5, 1.7, 2, 5 and 10.

In an embodiment, the power of the input light within the Raman crystal is at least 11.5 W.

In an embodiment, the input light comprises a plurality of pulses. The plurality of pulses may each have a full-width-half-maximum temporal width of less than 100 ns. The plurality of pulses may be generated by Q-switching. Alternatively, the input light may be continuous wave.

In an embodiment, within the Raman crystal the input light is encompassed by the Stokes light.

Disclosed herein is a system for converting an input light into an output light beam that has a spatial beam quality that is greater than that of the input light. The system comprises an optical resonator having disposed therein a Raman crystal. The Raman crystal is for receiving the input light and the optical resonator is configured to resonate a Stokes light beam generated from the input light by at least one nonlinear interaction within the Raman crystal. The at least one nonlinear interaction comprises at least one Raman interaction. The Stokes light beam has a spatial beam quality that is greater than that of the input light. The system comprises a light extractor arranged to generate the output light beam by extracting at least some of the Stokes light beam from the optical resonator.

In an embodiment, the input light may comprise an input light beam. The input light beam may comprise a plurality of transverse modes. The input light may comprise a plurality of input light beams. The plurality of input light beams may each comprise a plurality of transverse modes.

In an embodiment, the Raman crystal comprises a diamond crystal. Alternatively or additionally, the Raman crystal comprises at least one of Si, KTP, KTA, $LiNbO_3$, KGW, $YVO_4$, $Ba(NO_3)_2$, and $BaWO_4$.

An embodiment comprises an axis aligner for alignment of a polarisation axis of the input light and the <111> axis of the diamond crystal. The axis aligner may be arranged to rotate the diamond and/or rotate the polarisation axis of the input light.

In an embodiment, the order of the Stokes light beam is at least second order with respect to the input light. The at least one nonlinear interaction may comprise a first Raman interaction generating a first Stokes light beam that is a first order Stokes with respect to the input light, and a second Raman interaction generating the Stokes light beam which is a second order Stokes with respect to the input light.

An embodiment comprises an input light focuser arranged to form a waist of the input light at the Raman crystal. The resonator may be configured for the input light within the Raman crystal to be encompassed by the Stokes light beam. The resonator may comprise resonator mirrors configured for the input light beam within the Raman crystal to be encompassed by the Stokes light beam.

An embodiment comprises an input light source configured to generate the input light. The input light source may be configured for the power spectrum of the input light when so generated to have a maximum between 0.8 µm and 2.1 µm. The input light source may be configured for the power spectrum of the input light when so generated to have a maximum between 1.0 µm and 1.4 µm. The input light source may be configured for the power spectrum of the input light when so generated to have a maximum between 1.06 µm and 1.07 µm.

The input light source may be configured for the input light when so generated to have a $M^2$ greater than at least one of 1.7, 2, 3, 5, and 10. The input light source may be configured for the input light when so generated to have a $M^2$ less than at least one of 50, 20, 10 and 5. The input light source may be configured for the input light when so generated to comprise a plurality of pulses each having a full-width-half-maximum width of less than 100 ns. The input light source may comprise a Q-switch. Alternatively, the input light source may be one of a continuous-wave and a quasi-continuous input light source. A continuous-wave input light beam source is generally, in the context of this specification, a continuous input light for a period of greater than 0.1 ms.

In an embodiment, the input light source is configured for the input light when so generated to be linearly polarized. Alternatively, the input light source may be configured for the input light when so generated to be one of an elliptically, circularly and randomly polarized.

In an embodiment, the $M^2$ of the output light beam and the Stokes light beam is less than that of the input light. The Stokes light beam may have a $M^2$ of less than 1.2. The output light beam may have a $M^2$ of less than 1.2.

An embodiment is configured such that the power of the input light when so generated, within the Raman crystal is at least 11.5 W.

In an embodiment, the intrinsic beam brightness of the output light beam and the Stokes light beam is greater than that of the input light. This embodiment may be configured such that the intrinsic beam brightness of the output light beam when so generated divided by the intrinsic beam brightness of the input light when so generated is greater than at least one of 1, 1.15, 1.5, 1.7, 2, 5 and 10.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 1:
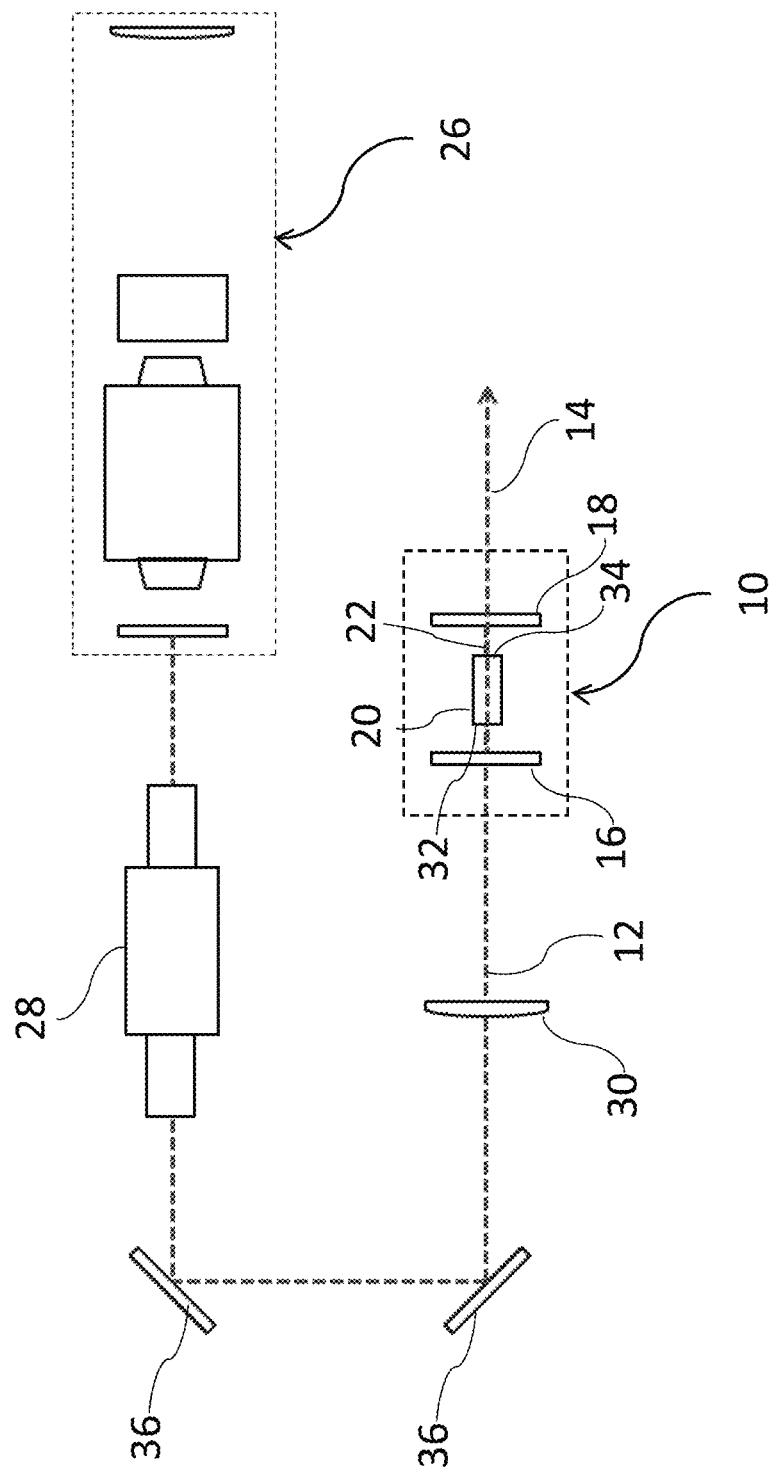
FIG. 1 shows an embodiment of a system for converting an input light into an output light beam that has spatial beam quality that is greater than that of the input light.

FIG. 1 shows an embodiment of a system generally indicated by the numeral 10. The system 10 is for converting an input light 12 into an output light beam 14 that has a spatial beam quality that is greater than that of the input light 12. The system 10 has an optical resonator in the form of a linear optical resonator, which in this embodiment is defined by reflectors 16 and 18. In this embodiment, the reflectors 16,18 are in the form of mirrors. Disposed between the mirrors 16,18 is a Raman crystal 20. The Raman crystal 20 receives the input light 12. The optical resonator is configured to resonate a Stokes light beam 22 generated from the input light 12 by at least one nonlinear interaction within the Raman crystal 20. The at least one nonlinear interaction comprises at least one Raman interaction and the Stokes light beam 22 has a spatial beam quality that is greater than that of the input light 12. The system 10 has a light extractor 18 arranged to generate the output light 14 by extracting at least some of the Stokes light beam from the optical resonator. In this embodiment but not in all embodiments, the light extractor is the mirror 18, which is arranged to partially transmit the Stokes light beam 22.

In some but not all embodiments, at least one turning mirror 36—specifically two in this embodiment—may be used to steer the input beam into the Raman crystal 20.

In the embodiment of FIG. 1, the input light 12 is an input light beam. In alternative embodiments, however, the input light may comprise a plurality of input light beams.

In this but not necessarily in all embodiments, the Stokes light beam 22 generated within system 10 is a second order Stokes light with respect to the input light. The at least one nonlinear interaction comprises a first Raman interaction wherein the input light 12 interacts with the Raman crystal 20 to generate a first Stokes light beam. The first Stokes light beam is a first order Stokes light with respect to the input light. The resonator is configured to resonate the first Stokes light beam by the mirrors being reflective thereto. The at least one nonlinear interaction also comprises a second Raman interaction wherein the first Stokes light beam interacts with the Raman crystal 20 to generate the Stokes light beam 22, which is a second order Stokes light with respect to the input light 12. There may be more or less nonlinear interactions in other embodiments. In one example, the second Raman interaction may be negligible or non existent. In another example, there may be a third Raman interaction wherein the second Stokes light beam, interacts with the Raman crystal to generate the Stokes light beam 22, which is a third order Stokes light with respect to the input light beam. The light extractor may be arranged to generate output light by extracting at least some of more than one of the Stokes orders. For example, the Stokes light beam may comprise more than one of the first order, second order, and third order Stokes light (and possibly higher orders of Stokes light) with respect to the input light beam.

The Raman crystal 20 is in this, but not necessarily in all, embodiments a diamond crystal. Diamond has a high thermal conductivity, generally greater than 1000 W/m/k, and low thermal expansion coefficient making it suitable for some high-power infrared Raman light generation embodiments. The diamond in this but not necessarily in all embodiments is an 8-mm long, low-nitrogen content, ultra-low birefringence, Type IIa single crystal diamond grown by chemical vapour deposition (Element Six, UK). The diamond crystal is orientated such that the propagation of the input light and Stokes light beam is along the <110> direction of the diamond crystal. End-faces 32, 34 of the Raman crystal 20 have deposited thereon dielectric coatings that transmit at the wavelength of the first Stokes to the input light (that is, in this embodiment, transmissive at a wavelength of 1240 nm). The dielectric coatings were also transmissive at the wavelength of the input light (in this embodiment 1064 nm) and at the wavelength of the second Stokes to the input light (in this embodiment 1485 nm), the transmission being greater than 95% at these wavelengths. The transmission may be greater (for example 98%) or lesser (for example 90%) in other embodiments.

In some other embodiments, the Raman crystal in system 10 alternatively or additionally comprises at least one of a Si, KTP, KTA, $LiNbO_3$, KGW, $YVO_4$, $Ba(NO3)_2$, and $BaWO_4$ crystal. In yet other embodiments, the Raman crystal may be Raman crystal waveguide comprising at least one of a diamond, Si, KTP, KTA, $LiNbO_3$, KGW, $YVO_4$, $Ba(NO3)_2$, and $BaWO_4$ crystal.

Shown in FIG. 1 is an input light source 26 configured to generate the input beam 12. In this embodiment, the input light source 26 comprises a diode-side pumped $Nd:YVO_4$ module in a plano-convex cavity configuration with a 25% output coupling. Input light source 26 comprises a Q-switch to produce a plurality of pulses with a repetition rate of between approximately 1 kHz and 100 kHz, each of the plurality of pulses having a full-width-half-maximum temporal width of the order of 10 ns to 100 ns.

The output of the $Nd:YVO_4$ module is then amplified using a second side-pumped $Nd:YVO_4$ module to produce more than 50 W of available average optical power. The addition of the amplifier stage decreased the measured input light quality from an $M^2$ of around 2.5 to a $M^2$ of 3.0 in the horizontal direction and $M^2$ of 3.8 in the vertical direction. In an alternative embodiment, a relatively low beam quality rare earth doped laser, for example a Nd:YAG, Yb:YAG, Nd:Glass or Yb:Glass laser with a flat-flat resonator having an output with an $M^2$ of, say, less than any one of 50, 20 and 10 may be used as a light source 26. Generally any suitable input light source may be used, including laser oscillator, laser oscillator and amplifier, suitable diode lasers and arrays and stacks thereof as appropriate, mode locked lasers, continuous wave lasers, lasers having rare earth doped crystalline or glass laser media, gas lasers, and a combination thereof etc. The use of light sources that in use emit a low beam quality beam may be desirable in some embodiments. Such light sources may be relatively inexpensive and/or high powered, while the system 10 may still have relatively good beam quality, effectively upgrading the quality of the light from the light source.

Figures 2, 3, 4:
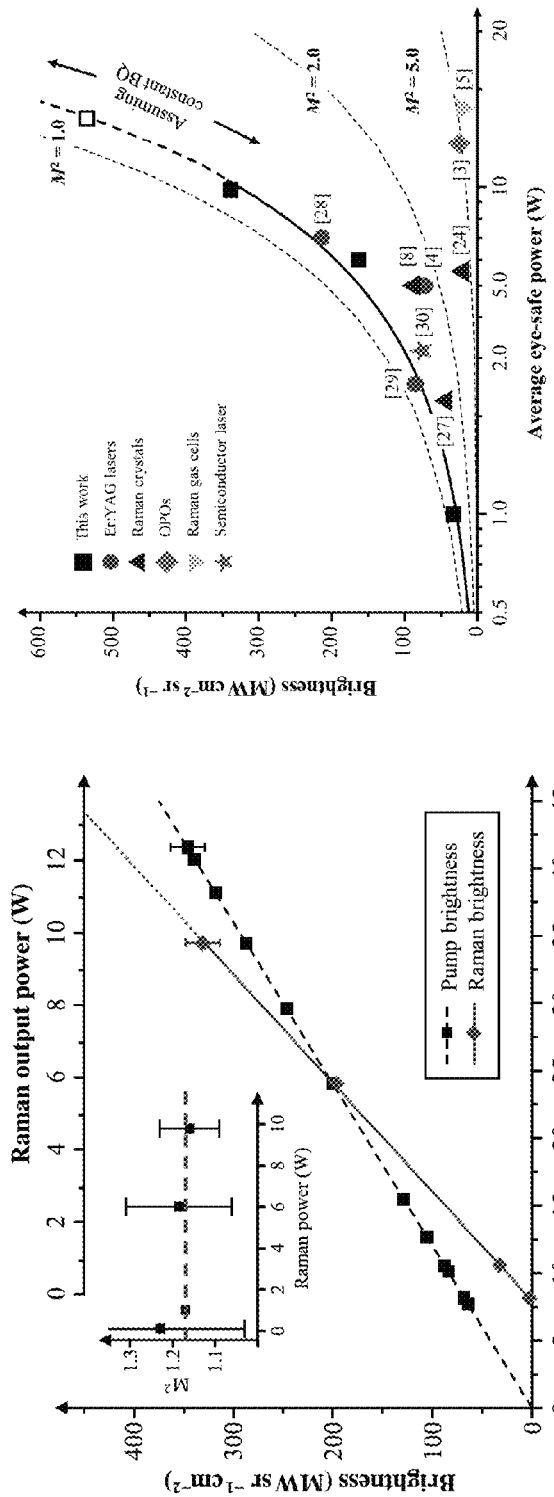
FIG. 2 shows a graph of, for the system of FIG. 1, the measured brightness of the input light and the output light beam as a function of input light power transmitted by the input coupler.
FIG. 3 is a graph plotting the brightness achieved by the system of FIG. 1 compared to that of other competing prior art systems.
FIG. 4 shows an example of an input light source configured to generate a plurality of input light beams.

In alternative embodiments, the input light comprises a plurality of input light beams. The plurality of light beams may be achieved using polarization combiners, spatial multiplexing, or generally any suitable method. FIG. 4 shows an example of an input light source 40 configured to generate a plurality of input light beams 44. The input light source 40 comprises a plurality of lasers 42 and is arranged to combine the output of each of the plurality of lasers to form the input light 46. In an alternative example, the plurality of lasers 42 are arranged such that the plurality of input light beams are parallel adjacent the plurality of lasers 42. The plurality of parallel input lights beams are incident on a lens that focus the plurality of light beams to form the input light 46.

The input light source, in the embodiment of FIG. 1 but not necessarily in all embodiments, is configured for the power spectrum of the input beam when so generated to have a maximum between 1.06 µm and 1.07 µm, however it will be appreciated that this range may be extended, for example between 1.0 µm and 1.4 µm for the generation of an output light beam having a wavelength in the eye-safe spectral region. For example, the input light source may comprise Nd:YALO, in which case the maximum of the power spectrum is at 1079 nm. The input beam source may, however, be generally any suitable wavelength for which a sufficiently strong Raman interaction may be achieved. Spectral regions outside the eye-safe spectral region, for example, visible or near infrared, may be targeted.

The input beam source, in various embodiments, is also configured for the input beam when so generated to:

1. have a $M^2$ greater than at least one of 1.7, 2, 3, 4, 5 and 10.
2. have a $M^2$ less than at least one of 50, 20, 10 and 5.

In the various embodiments, the $M^2$ of the Stokes light beam and the output light beam is generally but not necessarily less than 1.2. Generally, as the spatial quality of the input light improves, the easier it is to achieve a high spatial quality Stokes light beam and output light beam.

Conversion efficiency may be influenced by the polarization and the coherence of the input light beam. As Raman gain is dependent on polarization for many Raman crystals, polarization may, but not necessarily, be beneficially selected to increase gain, reduce threshold, consequently increasing conversion efficiency. A polarisation manipulation module 28 conditions the input light 12. The power of the input light is selected using a rotatable half wave plate and high-power optical isolator within the polarisation manipulation module 28. A second half wave plate in the module 28 is used to align the polarization of the input light to the <111> axis of the diamond crystal 20 to increase Raman gain. Consequently, the polarisation manipulation module comprises a polarisation axis aligner ("axis aligner"). Other embodiments may replace the module 28 with a half wave plate fixed to a rotation mount for polarisation control, and optical power may be selected by selecting an electrical power at the Nd:YVO$_4$ module. Module 28 may also act to attenuate the input light 12 back reflected from the system 10 in order to prevent damage to the input light source 26 or perturb its performance. In alternative embodiments, the axis aligner comprises a diamond crystal receiver arranged to receive the diamond crystal, and an attachment portion configured to be attached to a frame or surface. The diamond crystal receiver is rotatably attached to the attachment portion. The diamond crystal receiver may be rotated, and so rotating the diamond crystal 20 when so attached, to align the polarisation of the input light and the <111> axis of the diamond crystal 20.

In some applications, it may be beneficial to use an unpolarised input light 12 or an input light beam 12 with nonlinear polarization (for example, for high power pump lasers in which thermal effects depolarize their output beam)

In the present embodiment, an input light focuser 30 in the form of a lens of a focal length of 100 mm focuses the input light 12 to form a waist at the diamond crystal 20, the waist having, in this embodiment, a 141 μm diameter. The waist may be within the diamond crystal 20 as in this embodiment, or adjacent thereto in other embodiments. In this but not necessarily in all embodiments the input light 12 consequently has a confocal parameter that exceeds the diamond 20 length. Other lenses, confocal parameters and diamond 20 lengths may be used as appropriate in other embodiments.

System 10 may optionally include the input light source 26, and the optics in the path of the input light 12.

The optical resonator is configured for the input light 12 within the Raman crystal 20 to be encompassed by the Stokes light beam 22. This generally may provide sufficient discrimination of the lowest order spatial mode of the optical resonator for improving the spatial beam quality of the output light beam 14. The resonator comprises resonator mirrors configured for the input light beam within the Raman crystal to be encompassed by the Stokes light beam. The optical resonator is, in this but not all embodiments, a stable optical resonator. Mirror 16 has a 20 cm radius-of-curvature (RoC) and mirror 18 has a 200 cm RoC which give calculated cold-cavity TEM$_{00}$ fundamental mode beam diameters of 341 μm at 1240 nm and 374 μm at 1485 nm.

The physical resonator length is 2 cm. The input mirror 16 is at least 85% transmissive at the input light wavelength of 1064 nm and has a reflectivity of greater that 99.5% at the first, second and third order Stokes to the input light beam 12 (1240 nm to 1850 nm). The mirror 18 is a light extractor or output coupler for the second and higher order Stokes and is highly reflective at the input light wavelength (for double pass pumping and enhanced conversion) and at the first Stokes wavelength to form a high-Q first Stokes resonator. The mirror 18 has greater than 80% transmission at the second Stokes order for significant output coupling. In this but not necessarily in all embodiments, the product of the reflectivities of the mirrors 16 and 18 at the third Stokes was low (less than 20%) to prevent loss to higher order Stokes generation. The various transmission and reflection values may vary as appropriate and suitable.

The above described configuration of the system 10 is such that the power of the input light, within the Raman crystal is at least 11.5 W. The system 10 attains laser threshold for 11.5 W of pump incident on the diamond crystal and output power increases with higher pump power in a linear fashion. At the maximum available power, the system 10 produces an output light beam 14 having 16.2 W of power. The slope efficiency of the system 10 is 58.6%. At maximum output power, the system has an overall conversion efficiency at maximum output power of 40%, which the applicant believes is a record conversion efficiency for Raman lasers at such high power levels. At the 5 W output power level, the Raman pulse width was 12 ns, compared to the 22 ns pump pulse.

The power of the output spectrum was greatest at the 1485 nm second-Stokes wavelength, but also included minor first and third Stokes components. The contrast between the second Stokes and the first or third Stokes within the output light beam is greater than $2.5 \times 10^3$.

The beam quality of the output light beam 14 was measured for average output powers up to 10 W for the laser operating near conditions of providing maximum efficiency. Near diffraction-limited beam quality was observed across the entire power range with a constant $M^2$ of 1.17. FIG. 2 shows a graph of the measured brightness of the input light 12 and the output light beam 14 as a function of input light power. The input light power is 10% higher than the input light power transmitted by the input coupler.

One definition of intrinsic beam brightness B is:

$$B = \frac{P}{\lambda^2 M_x^2 M_y^2}$$

where P is the average power, λ is the beam wavelength and $M_x^2$ and $M_y^2$ are the beam quality factors in the x and y directions respectively. The intrinsic beam brightness is an intrinsic property of a beam. A beam with high intrinsic brightness can be tightly focussed and can be made to be less divergent than a beam with lesser intrinsic brightness.

At 10 W output power, the input and output beams had, in SI units, a brightness of 318 MWsr$^{-1}$ cm$^{-2}$ and 335 MWsr$^{-1}$ cm$^{-2}$ respectively. The brightness enhancement (BE) was thus 1.05 at this power level. The beam brightness incident on the crystal was 289 MWsr$^{-1}$ cm$^{-2}$, so that in terms of the incident beam on the crystal the brightness enhancement was 1.15. Output beam brightness increases linearly with pump power as illustrated in FIG. 2 in accordance with the linear response of the Raman laser for the fixed input and output $M^2$ factors. Surprisingly, intrinsic beam brightness enhancement (that is, the brightness of the output light beam is greater than the brightness of the input light) is at least unity for output powers above 6 W. Although the applicant was unable to obtain a value for $M^2$ under conditions generating 16.2 W of output power, the applicant is of the view that there was no significant deterioration in beam quality at this higher level. Thermal effects in the highly thermally conductive Raman material are negligible at the current power levels. The near-field beam profile was unchanged across the entire power range. The applicant thus deduces that the brightness at maximum output power was B=540 MWsr$^{-1}$ cm$^{-2}$ and 1.55 times higher than the input light.

The intrinsic beam brightness of the output light beam 14 when so generated by this or other embodiments of a system divided by the intrinsic beam brightness of the input light when so generated may be greater than at least one of 1, 1.15, 1.5, 1.7, 2, 5 and 10.

To the applicant's knowledge, the average output power and intrinsic beam brightness of the output beam are each the highest reported for crystal Raman lasers having a single output beam operating in any spectral region.

In terms of the quantum conversion efficiency, $\eta = P_{out}\lambda_{in}/P_{in}\lambda_{out}$, the intrinsic beam brightness enhancement factor (BE) is $$BE = \eta \left(\frac{M_{in}^2}{M_{out}^2}\right)^2 \left(\frac{\lambda_{in}}{\lambda_{out}}\right)^3$$

where the in/out subscripts refer to the input light 12 and the output light 14 of the system 10. Thus in order to achieve intrinsic brightness enhancements greater than 1, high efficiency and sufficiently improved beam quality to overcome the cubic dependence on the frequency downshift may be required. The applicant believes that this is the first disclosure of an intrinsic beam brightness enhancement factor of at least unity in a Raman crystal laser. This is a surprising result and for which there has been a long felt need.

FIG. 3 is a graph plotting the brightness achieved by the system 10 compared to that of other competing prior art systems. The brightness and average power achieved in the eye-safe 1400 nm-1800 nm spectral region also compares favourably with competing eye-safe technologies. While Er:YAG lasers show promise when resonantly pumped, to date, 7 W of output power has been demonstrated which is a factor of two weaker than that achieved by the system 10 of FIG. 1. Although the heat deposited in resonantly pumped laser is very small because of the small quantum defect, the thermal properties of the inversion material is typically several orders poorer than that of diamond. Scaling to higher powers is likely to be a greater challenge in terms of thermal management and pump development compared to diamond Raman lasers. As demonstrated by table 1, the thermal properties of diamond are superior to that of many Raman crystals. Other Raman crystals, however, may be used.

TABLE 1

Properties of selected Raman crystals at room temperature.

| Material | Diamond | Silicon | LiIO$_3$ | Ba(NO$_3$)$_2$ | KGW | BaWO$_4$ | YVO$_4$ |
|---|---|---|---|---|---|---|---|
| Crystal/optical class | Cubic/ isotropic | Cubic/ isotropic | Hexagonal/– uniaxial | Cubic/ isotropic | Monoclinic/ biaxial | Tetragonal/+ uniaxial | Tetragonal/+ uniaxial |
| Raman Shift | 1332.3 | 521 | 770, 822 | 1047.3 | 768, 901 | 926.5 | 890 |
| Raman linewidth FWHM (cm$^{-1}$) | 1.5 | 1.24 | 5.0 | 0.4 | 7.8, 5.9 | 1.6 | 3.3 |
| T$_2$ (ps) | 7 | 8.5 | 2.1 | 26 | 1.4, 1.7 | 6 | 3.5 |
| Transmission range (μm) | >0.23 | >1.1 | 0.31-4 | 0.35-1.8 | 0.34-5.5 | 0.28-5 | 0.4-5 |
| dn/dT (10$^{-6}$ K$^{-1}$) | 15 | 215 | −95 −80 | | 0.4 | | 3 (a) 8.5 (c) |
| Thermal conductivity (W/mK) | 2000 | 153 | 4 | 1.17 | 2.6[100] 3.8[010] 3.4[001] | 2.32 2.26 | 5.2 |
| Thermal Expansion (×10$^{-6}$ K$^{-1}$) | 1.1 | 3 | 28 (a) 48 (c) | 18.2 | 4.0 3.6 8.5 | 8.2 8.9 31.2 | 4.43 |
| Heat capacity (J/gK) | 0.52 | 0.75 | 0.58 | 0.6 | | 0.31 | |
| Refractive index n at 1.064 μm | 2.41 | 3.42 | 1.85 (o) 1.72 (e) | 1.56 | 1.98 p 2.01 m 2.06 g | 1.84 | 1.96 2.17 |
| Density (g/cm$^3$) | 3.52 | 2.33 | 4.5 | 3.25 | 7.3 | 6.4 | 4.23 |
| Raman gain @1064 nm | 10-12 | (20 @1550 nm) | 4.8 | 11 | 3.5 | 8 | 4.5 |
| Growth Method | CVD or HPHT | Czochralski or Float Zone | Aqueous | Aqueous | Flux or Czochralski | Czochralski | Czochralski |
| Density (g/cm$^3$) | 3.52 | | | 3.25 | 7.3 | 6.4 | 4.24 |
| Poisson's Ratio | 0.069 | | | 0.237 | 0.3 (est) | 0.3 (est) | 0.33 |
| Young's modulus (GPa) | 1100 | | | | 115.8 (a) 152.5 (b) 92.4 (c) | | |
| Fracture strength (GPa) | 4 | | | | 0.14 (a) 0.102 (b) 0.064 (c) | | |

TABLE 1-continued

Properties of selected Raman crystals at room temperature.

| Material | Diamond | Silicon | LiIO$_3$ | Ba(NO$_3$)$_2$ | KGW | BaWO$_4$ | YVO$_4$ |
|---|---|---|---|---|---|---|---|
| Combined loss coeff @ 1st Stokes (%/cm) | 0.2 (20 ppb) | | | 0.2 | 0.2 | 0.2 | 0.2 |
| Raman gain coefficient @532 nm (cm/GW) | 30 | | | 47 | 20 (est.) | 35 | 25 (est.) |

Other embodiments of the system for converting an input light into an output light beam that has a spatial beam quality that is greater than that of the input light may comprise a second-order nonlinear crystal disposed within the optical resonator. The second order non-linear crystal may be arranged to generate light having twice the frequency of a light within the resonator, a frequency that is the sum of two lights within the resonator, or a frequency that is the difference of the frequency of two lights within the resonator. The light extractor may be arranged to extract the light generated by the second order non-linear crystal.

Selection of Input Light Parameters

For lower input powers, the conversion efficiency may reduce due to the finite threshold of the system 10. Increasing pump power may lead to damage, however. Thus, in order to increase the power of the system 10, it may be necessary to increase the transverse size of the input light 12 in the Raman crystal 20.

The transverse size of the input light 12 in the Raman medium 20 may be varied by changing the position or strength of lens 30 or other optics in the input light beam line. Decreasing transverse size increases the risk of damage to components in the system 10. It may also cause loss of conversion efficiency to the desired Stokes order due to loss of power to excitation of higher Stokes orders depending upon the reflectivity spectra of the cavity mirrors. Increasing the spot-size may reduce the Raman gain, leading to an increase in threshold and lower conversion efficiency. An increased transverse size of the input light 12 may also cause the system 10 to operate on multiple transverse modes which may reduce BE through a decrease in output beam quality. The latter may be addressed by selecting suitable optical resonator parameters, for example mirror curvature and/or mirror separation. When increasing the transverse size of the input light, it is generally but not necessarily advantageous to ensure that the Raman material 20 is sufficiently large to ensure that the beams are not vignetted by the Raman crystal 20 sides.

Optical Resonator Parameters

Optical resonator parameters include optical resonator type (examples of which include standing wave, folded cavity, ring resonator etc), cavity length, and mirror curvatures. The choice of parameters for system 10 may influence BE.

In general, it is desirable to have an optical resonator with as few cavity elements as possible to keep optical losses to a minimum, which may generally reduce threshold and increase efficiency. The resonator may be, but not necessarily, approximately 1 cm longer than the Raman crystal 20. In alternative embodiments, it may be at least one of 0.1, 0.2, 0.5, 2, 5, 10, 50 cm longer than the Raman crystal 20. In some embodiments, the resonator may be the same length as the Raman crystal 20 by placing mirror coatings on the diamond end faces.

The transverse dimensions of the Raman crystal 20 is typically at least 1 mm for the case of a bulk crystal. Smaller transverse dimensions, for example between 0.001 and 1 mm, may be possible in the case of waveguide Raman lasers. One consideration for selecting the dimension is to ensure there are no substantial optical resonator losses introduced by beam vignetting.

Transverse dimensions may also be determined by the thermal management of the system 10. The heat generated in the Raman crystal 20, which occurs due the inelastic scattering and parasitic absorption, is generally, but not necessarily, unwanted due to its effect on causing refractive index gradients, distorting the crystal 20 shape, altering the crystal 20 gain properties and causing stresses that may result in further index gradients, beam depolarization or crystal 20 fracture. In the case of diamond, which has a very high thermal conductivity, larger transverse dimensions may be generally an advantage because heat may more effectively removed from external faces that have a larger area. It may be an advantage to use Raman crystals with at least one small transverse dimension and with an effective heat sink, such as a solid heatspreader or fluid cooling, applied to the external faces. A choice for a solid heatspreader is single crystal diamond or polycrystalline diamond material. In the case of a diamond Raman laser, this may be a good choice due to the materials having the same or very similar thermal expansion coefficients.

Short optical resonators may reduce the footprint of the system 10. For pulsed input lights 12, the optical resonator length may be short compared to the length of the pulses of the input light 12 so that the Stokes light spectrum and spatial properties may be strongly conditioned by the optical resonator. For example, when using Q-switched input light pulses, which typically have pulse lengths of the order of several meters, it may be beneficial for the optical resonator length to be as close as possible to the Raman crystal 20 length (0.5-5 cm). For a pulsed input light 12 of high repetition rate, it may be an advantage to select the optical resonator length so that the round trip time for Stokes light is equal to the input light inter-pulse period (or an integer fraction thereof). In this way, the Stokes light may resonantly build up in phase with the most intense periods of the input light 12 pulses.

Mirror 16,18 curvature generally influences the system 10 performance by changing the transverse dimensions of the Stokes beam 22 in the Raman crystal 20. In some cases, the Stokes beam spot-size for the TEM$_{00}$ mode may be estimated a priori for a resonator using Gaussian beam propagation solvers such as LASCAD, WINLASE etc. For fixed input beam parameters, there may generally, but not necessarily, be an optimum Stokes light beam 22 spot-size. For decreasing spot-size, conversion efficiency may decrease as the wings of the input light 12 may not be able to be efficiently converted into the input light 12. For increasing spot-size, conversion efficiency may decrease because of reduced overlap between the Stokes beam 22 and input light 12 and the resulting reduced Raman gain. Various embodiments have various mirror curvatures. The mirrors may be concave, convex or flat. The radius of curvature may vary from microns to infinite in the case of flat mirrors.

Mirrors may be selected to allow the input light to pass through the Raman medium 20 with minimum reflection loss. It may also be beneficial for the pump beam 20 to make a second or multiple passes through the medium 20. For a given pump beam 20 and optical resonator design, there is generally, but not necessarily, an optimum output coupling value at the wavelength of the output Stokes beam. For increasing output coupling, conversion efficiency may decrease due to an increased threshold for generation of the output Stokes order and thus reduced conversion efficiency. For decreasing output coupling, efficiency may decrease due to the greater impact of cavity parasitic loss, or in the case of second Stokes output, due to the reduced conversion of the input light to the first Stokes. The output coupling may be no more than 50%. Alternatively it may be no more than one of 0.3, 0.6, 1, 2, 4, 10, 20, 30, 40, 60, 80, and 90%. Resonator mirrors may also be selected to ensure a high cavity loss for the next highest Stokes order of the output light beam 14. This may be beneficial for applications requiring output light beam wavelength to be dominated by a single Stokes order. For a second Stokes laser, for example, the sum total round trip loss at the third Stokes may be selected to ensure the third Stokes does not reach threshold across the envisaged operating range. Round trip losses at this higher Stokes order may need to be in the range of 1 to 90%, and may be higher than the output coupling. At the wavelengths of lower Stokes orders than the desired output Stokes order, if there are any, the cavity loss may be selected to be as low loss as possible. For example, the loss at these lower order Stokes wavelengths may be less than 1%. Alternatively, the loss may be less than 5, 10, 20 or 40%, for example.

Raman crystals may be characterized by their Raman shift, Raman gain coefficient, phonon dephasing time (or equivalently the Raman linewidth), and their optical and thermo-mechanical properties (thermo-optic, thermal conductivity, thermal expansion, elastic and photo-elastic tensors). The Raman crystal may be selected according to the Raman shift required for the application, and its properties that enable maximum BE. It may be an advantage to select a Raman material with a small Raman shift (eg. RTP which has a Raman shift of approximately 270 $cm^{-1}$), as the maximum conversion efficiency achievable and thus BE is higher. High gain coefficients are generally favourable for reducing threshold and thus increasing conversion efficiency. The phonon dephasing time may be a consideration when converting ultrashort laser pulses, in which case a shorter dephasing time may be beneficial (for a given Raman gain coefficient). The thermo-optical parameters may be selected to minimize aberrations and depolarization in the Raman medium. In the case of high power, the material may be selected to have a high limit for thermal stress fracture and high optical damage threshold. It is generally beneficial for the Raman material to be highly transmitting (ie., low absorption loss) at the input and Stokes wavelengths, and to not induce beam depolarization. Diamond is generally, but not necessarily, a good material choice owing to its high Raman gain, high thermal conductivity and low thermal expansion coefficient and high stress fracture limit. Low birefringence diamond with low absorption is presently available using CVD growth methods. It may also be a benefit (e.g. for cost or to enable synthesis large sizes) to use diamond grown by other methods such as high pressure high temperature technique) or synthesized as polycrystalline diamond.

The Raman crystal length may be optimized to enhance BE and prevent crystal surface damage. Longer crystals may enable a reduced threshold and greater efficiency, on account of the longer gain length. This is especially so for the case of a beam waist that has a confocal parameter of the order or longer than the crystal. Longer crystals may also reduce the beam intensity at the end faces, which may be an advantage for operating at high power without damage. Increases in length must be balanced against increased parasitic losses in the crystal (such as bulk absorption and scatter). This is especially the case for devices that have a low output coupling. Long crystals may also be a disadvantage due to loss of output to higher Stokes orders, and due to their higher cost. The Raman crystal length may be 1 cm long. Alternatively, it may be less than at least one of 0.1, 0.2, 0.5, 2, 5, 10 or 15 cm long, or greater than 15 cm long.

In conclusion, the applicant discloses herein an externally-pumped diamond Raman laser with brightness-enhanced output and efficient wavelength conversion from 1.064 μm to 1.485 μm at high output power. This device demonstrates an output light beam that has a $M^2$ that is 2.7 times less than that of the incident pump beam, and an intrinsic brightness that is 1.55 times more than that of the incident light beam. With more than 40% overall conversion from a moderately-bright pump source, diamond Raman laser technology may be a useful add-on to convert mature 1 μm lasers for a range of eye-safe applications.

Now that embodiments have been described, it will be appreciated that some embodiments may have some of the following advantages:
1. Poor quality input beams (e.g., $M^2>2$) may be converted to near-diffraction limited output (e.g., $M^2<1.2$)
2. An input light may be converted to a high power output light beam with improved intrinsic beam brightness, which may be highly desirable for laser applications that benefit from high intrinsic beam brightness.
3. Low brightness input lights may be used, which are generally readily available at relatively high powers, and which may avoid the additional optics, more stringent thermal management, and use of reliable laser materials that may be associated with high brightness input pump beams, which may consequently improve costs, footprint, reliability and performance.
4. Raman crystals are also generally free of Raman gas cell disadvantages' including large size, convective currents degrading beam quality at high powers, and problematic gas handling which all are significant impediments to the realisation of practical Raman lasers.

Any of the various features of each of the above disclosures, and of the various features of the embodiments described below, can be combined as suitable and desired.

Variations and/or modifications may be made to the embodiments described without departing from the spirit or ambit of the invention. For example, the light extractor may comprise a dispersive element, examples of which include but are not limited to an optical prism and a diffraction grating, disposed within the optical resonator, or may take any suitable form. The system and method may be adapted for generally any suitable input light wavelength, for generating wavelengths other than those generated by the described embodiment. The optical resonator may be in the form of a ring optical resonator, a Z optical resonator, a waveguide optical resonator, an unstable optical resonator or generally any suitable resonator. The input light may be generated by a diode laser operating around 800 nm or 980 nm, a chemical laser, a diode pumped atomic vapour laser, a frequency doubled Nd:YAG laser at 532 nm, at least one of a thulium and a holmium laser, a carbon monoxide laser operating around 5 μm, and an excimer laser operating an UV wavelengths such as 308 nm. A thin disk laser, a fibre laser, or a fibre laser system may generate the input light. The fibre laser system may include a large mode area fibre oscillator and/or an amplifier. Input light beams may be delivered in fibre bundles.

Generally any suitable input light source may be used to generate light over a wide range of wavelengths. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method to convert an input light beam having a beam quality factor ($M^2$) of greater than 1.7 into an output light beam that has a beam quality factor that is less than that of the input light, the method comprising the steps of:
   positioning a Raman crystal within an optical resonator receiving the input light;
   focusing the input light to form a beam waist at the Raman crystal;
   generating a Stokes light beam resonating within the optical resonator from the input light so received by at least one nonlinear interaction within the Raman crystal, the optical resonator being configured such that the input light is encompassed by the Stokes light beam within the Raman crystal, wherein the at least one nonlinear interaction comprises at least one Raman interaction and the Stokes light beam has a spatial beam quality that is greater than that of the input light; and
   generating the output light beam by extracting at least some of the Stokes light beam from the optical resonator, the output light beam having an $M^2$ value of less than 1.7 and an output intrinsic beam brightness greater than an input intrinsic beam brightness of the input light beam.

2. A method defined by claim 1 wherein the input light comprises an input light beam.

3. A method defined by claim 1 wherein the input light comprises a plurality of input light beams.

4. A method defined by claim 1 wherein the Raman crystal comprises a diamond crystal.

5. A method defined by claim 4 comprising the step of aligning a polarization axis of the input light and the <111> axis of the diamond crystal.

6. A method defined by claim 1 wherein the order of the Stokes light is at least second order with respect to the input light.

7. A method defined by claim 1 wherein the power spectrum of the input light has a maximum between 0.8 μm and 2.1 μm.

8. A method defined by claim 1 wherein the power spectrum of the input light has a maximum between 1.06 μm and 1.07 μm.

9. A method defined by claim 1 wherein the Raman crystal comprises at least one of Si, KTP, KTA, $LiNbO_3$, KGW, $YVO_4$, $Ba(NO3)_2$, and $BaWO_4$.

10. A method defined by claim 1 wherein the input light has a $M^2$ greater than at least one of 2, 3, 5 and 10.

11. A method defined by claim 1 wherein the input light has a $M^2$ less than at least one of 50, 20, 10 and 5.

12. A method defined by claim 1 wherein the output light beam has a $M^2$ less than 1.2.

13. A method defined by claim 1 wherein the intrinsic beam brightness of the output light beam divided by the intrinsic beam brightness of the input light is greater than at least one of 1, 1.15, 1.5, 1.7, 2, 5 and 10.

14. A method defined by claim 1 wherein the power of the input light within the Raman crystal is at least 11.5 W.

15. A method defined by claim 1 wherein the input light comprises a plurality of pulses each having a full-width-half-maximum temporal width of less than 100 ns.

16. A method defined by claim 1 wherein the at least one nonlinear interaction comprises a first Raman interaction generating a first Stokes light beam that is a first order Stokes with respect to the input light, and a second Raman interaction generating the Stokes light beam which is a second order Stokes with respect to the input light.

17. A system to convert an input light beam having a beam quality factor ($M^2$) of greater than 1.7 into an output light beam that has a beam quality factor that is less than that of the input light, the system comprising:
   an optical resonator having a Raman crystal disposed therein;
   an input light focuser arranged to form a waist of the input light at the Raman crystal; and
   a light extractor arranged to generate the output light beam by extracting at least some of the Stokes light beam from the optical resonator, the output light beam having an $M^2$ value of less than 1.7 and an output intrinsic beam brightness greater than an input intrinsic beam brightness of the input light beam;
   wherein the Raman crystal is positioned to receive the input light and the optical resonator is configured to resonate a Stokes light beam generated from the input light by at least one nonlinear interaction within the Raman crystal such that the input light is encompassed by the Stokes light beam within the Raman crystal, and wherein the at least one nonlinear interaction comprises at least one Raman interaction and the Stokes light beam has a spatial beam quality that is greater than that of the input light.

18. A system defined by claim 17 wherein the resonator comprises a plurality of resonator mirrors configured for the input light beam within the Raman crystal to be encompassed by the Stokes light beam.

* * * * *